United States Patent
Angus

[11] Patent Number: 5,222,325
[45] Date of Patent: Jun. 29, 1993

[54] TREE PROTECTOR

[76] Inventor: Jerry-Frantz Angus, 159, Willibrord, Verdun, Quebec, Canada, H4G 2T5

[21] Appl. No.: 806,321

[22] Filed: Dec. 13, 1991

[51] Int. Cl.$^5$ .................................. A01G 13/00
[52] U.S. Cl. ............................. 47/30; 47/20; 135/100
[58] Field of Search ............. 47/30, 20, 31, 21; 135/100

[56] References Cited

U.S. PATENT DOCUMENTS

| | | | |
|---|---|---|---|
| 1,155,313 | 9/1915 | Hogan | 47/21 |
| 1,518,434 | 12/1924 | Klein | 47/21 |
| 1,834,084 | 12/1931 | Barnes | 135/100 |
| 1,975,752 | 10/1934 | Chase | 47/28.1 |
| 2,754,550 | 7/1956 | Johnson | 135/100 |
| 2,874,651 | 2/1959 | Peterson | 52/82 |
| 3,666,607 | 5/1972 | Weissman | 446/488 |
| 3,878,643 | 4/1975 | Greenman | 47/21 |
| 4,197,673 | 4/1980 | Thomas | 47/28.1 |

Primary Examiner—Henry E. Raduazo
Attorney, Agent, or Firm—Roland L. Morneau

[57] ABSTRACT

The tree protector is made of a plurality of adjacently positioned trapezoidal panels having one lateral side provided with tabs and another lateral side with corresponding slots for hooking the tabs of an adjacent panel. Each panel has a plurality of narrow elongated openings disposed substantially parallel to the slots having a maximum width of about 0.25 inches for allowing air circulation and preventing accumulation of snow inside the protector.

9 Claims, 4 Drawing Sheets

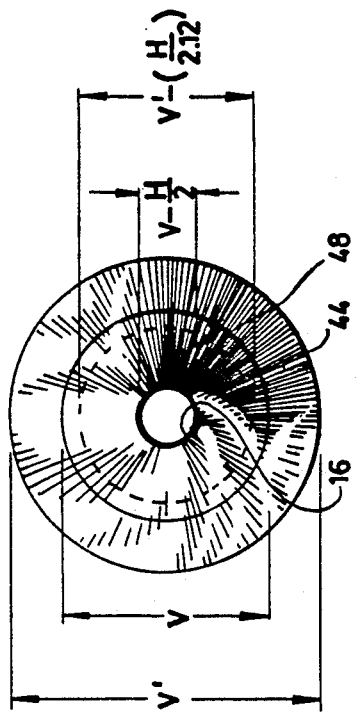
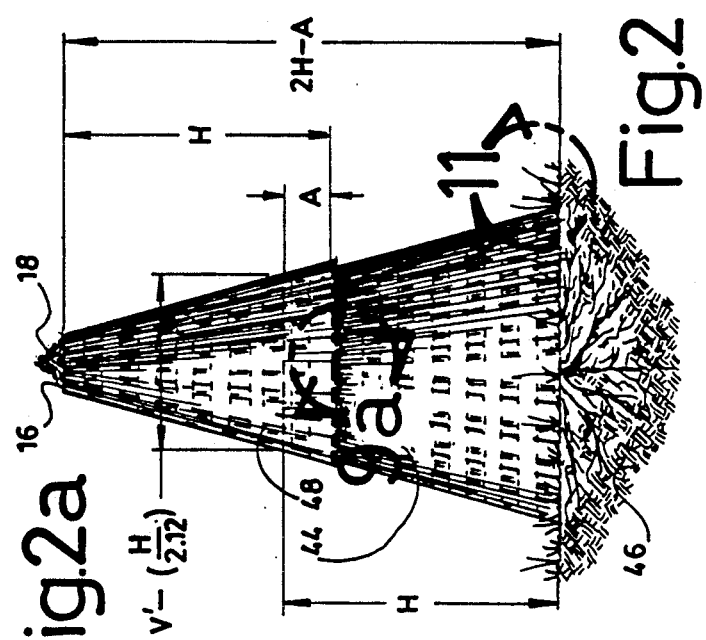
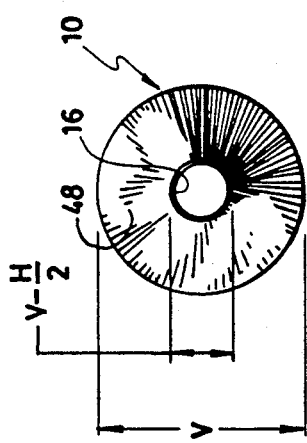
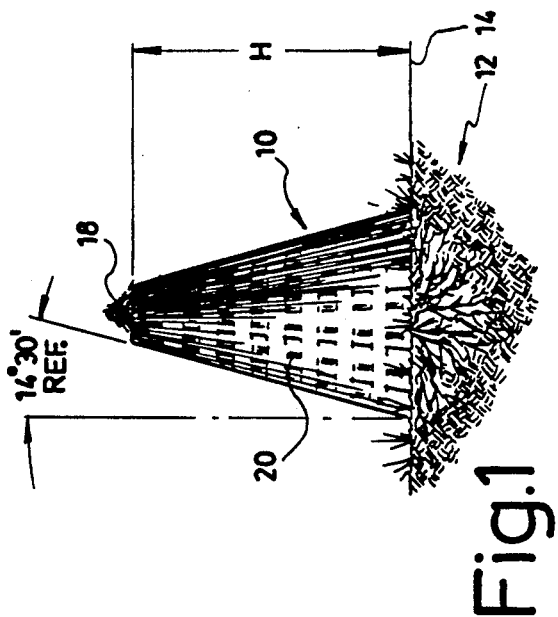

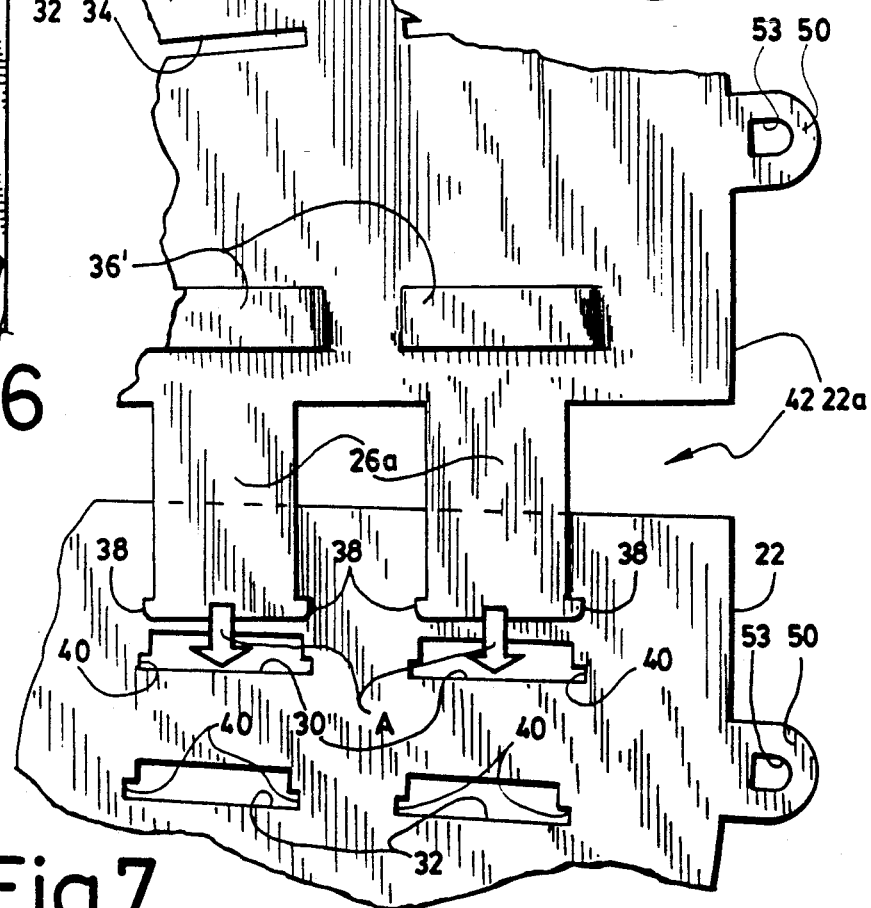

TREE PROTECTOR

BACKGROUND OF THE INVENTION

1. Field Of The Invention

The present invention is directed to a shield for plants and particularly cone-shaped trees for protecting them from ice, snow and wind. The shield is characterized by a set of separate trapezoidal panels adapted to be assembled to surround the trees in a cone-shaped manner. The panels are laterally connected to each other to form cone which can also be assembled to a superposed cone. Each panel is perforated to allow a limited circulation of air through the plant.

2. Prior Art

U.S. Pat. No. 4,665,645 to Schaw describes a tree planter box comprising a plurality of juxtaposed panels interconnected by upstanding channels and ribs adapted to vertically slide one into the other. These panels are not provided with any means for ventilating the inner part of the box nor with any means for superposing the boxes.

In U.S. Pat. to Hardman No. 2,665,523, a protective hot cap for plants is described. The cap makes use of a semi-circular blank having slots and tabs along its diameter which are adapted to form a cone to protect plants. Hardman does not contemplate the posibility of increasing the diameter of the protector by the multiplication of semi-circular panels. Furthermore, the cone shape of the protector is contemplated as being nearly closed at its apex due to the semi-circular shape of of the blank, the aperture being formed by a mere indentation in the blank. Such an aperture does not provide the possibility of superposing similar cones for housing larger plants.

In U.S. Pat. No. 4,903,431, the foldable cover for plants is characterized by contiguous panels separated by a fold line and accordingly are not intended to be separated. Furthermore, are used in combination with two hinged lid panels which are used to provide ventilation when opened.

The patent to Thomas in U.S. Pat. No. 4,197,673 makes use of a plurality of rectangular sheet-like plates which are intended to be vertically juxtaposed in order to accomodate growing plants. Thomas has not contemplated the formation of a complete perimeter around the tree and the protector which he has described cannot be formed by laterally assembled panels because these panels are essentially rectangular in shape. The panels are provided with square holes adapted to receive bolts and nuts for adjusting the panels at desired height relative to the tree to be covered.

SUMMARY OF THE INVENTION

The tree protector is made of a plurality of adjacently positioned trapezoidal panels having one lateral side provided with tabs and another lateral side with corresponding slots for hooking the tabs of an adjacent panel. Each panel has a plurality of narrow elongated openings disposed substantially parallel to the slots having a maximum width of about 0.25 inches.

BRIEF DESCRIPTION OF THE DRAWINGS

FIG. 1 is a side view of a conifer protector according to the present invention mounted over a conifer, FIG. 1a is a top view of the protector illustrated in FIG. 1, FIG. 2 is a side view of a pair of superposed conifer protectors according to the invention covering a conifer, FIG. 2a is a top view of the conifer protectors shown in FIG. 2, FIG. 5 is a cross-sectional view along line 5—5 of FIG. 3, FIG. 6 is a cross-sectional view along line 6—6 of FIG. 3, FIG. 7 is a front view of portions of two adjacent panels illustrating an interconnecting means between the panels, FIG. 9 is a front view of an embodiment for connecting panels of superposed conical protectors.

DETAILED DESCRIPTION OF THE INVENTION

Figures 3, 4:
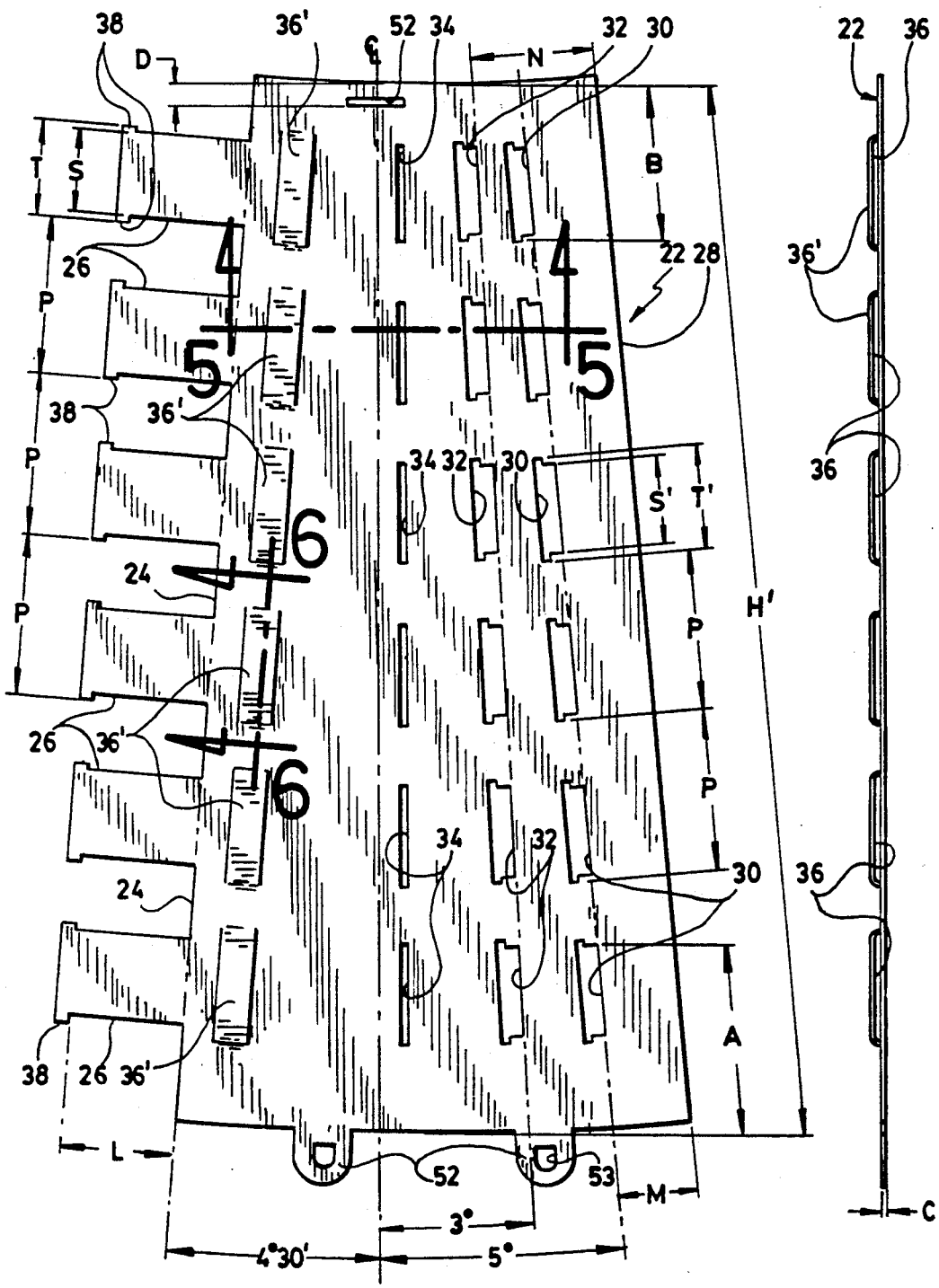
FIG. 3 is a front view of one of the panels used for forming a conifer protector according to the invention.
FIG. 4 is a side view of the panel shown in FIG. 3.

FIGS. 1 and 1a illustrates a conifer protector having a frusto-conical shape. The protector 10 in FIG. 1 covers a conifer 12 which extends below the surface of the ground 14. The protector has an opening 16 at the top and allows the apex 18 of the conifer to slightly extend therethrough and which provides an exit for an air circulation. The air circulation is obtained by the fact that the conical protector 10 is provided with a plurality of slots such as 20 shown in FIG. 1 which allows the air to circulate between the slots and the opening 16 at the top of the protector 10.

The protector 10 is made of a plurality of adjacently positioned trapezoidal panels 22 as shown in FIG. 3. The panel 22 has a lateral side 24 provided with tongues 26 and an opposite lateral side 28 whose ledge is provided with aligned slots 30. A second set of slots 32 adjacent the first set of slots 30 is also contemplated for the purpose explained later.

An additional provision for the circulation of air is also contemplated by a set of elongated openings 34 which are positioned adjacent the slots 32 and 34.

In order to further increase the circulation of air inside the conifer protector, an additional set of lateral gashes or openings 36 are provided on the surface of the panel 10. The openings 36 are obtained by punching a strip of material 36' in the panel 10 so that its surface protrudes into an arched flap above or below the plane of the panel 22. Such an arched flap may be obtained by different methods, one of which is by heating the strips 36 so that its final length is slightly longer than its length before the material is punched.

Figure 8:
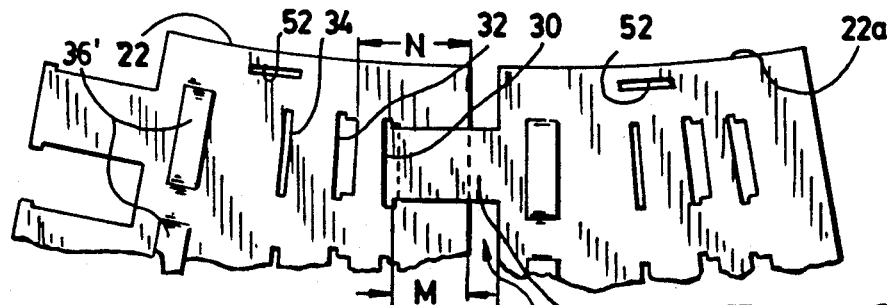
FIG. 8 is a view similar to FIG. 7 wherein the two panels are interconnected.
Figure 8A:
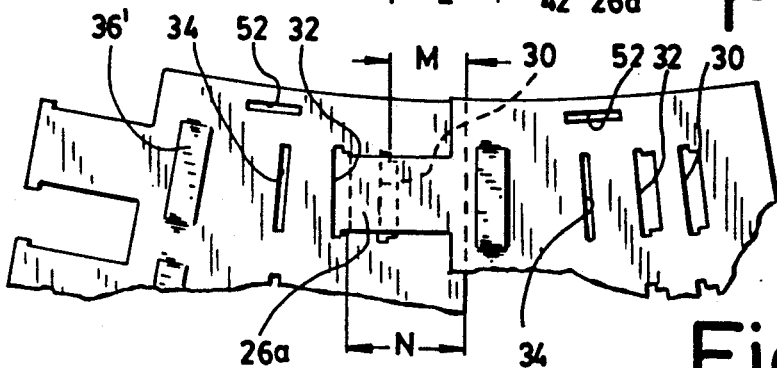
FIG. 8a is a front view of two adjacent panels interconnected to slots remote from the edge of one panel.

Depending on the size of the conifer, a plurality of panels such as 22 and 22a illustrated in FIGS. 7 and 8a are assembled to form a conical shape as shown in FIG. 1. The tongues such as 26a are adapted to hook into the slots 30. The type of tongues and slots illustrated in FIGS. 7 and 8 are particularly suitable for the present invention. Each tongue 26a has a pair of lateral protrusions 38 and the slot 30 has a pair of lateral clefts 40 suitably sized to allow the protuberances 38 to slide therethrough when facing each other when the tongue is pushed in the direction of the arrows A shown in FIG. 7. The protrusions 38 are adapted to hook into the narrower portion of the slots 30 when the tongue 26a is retracted in a direction opposite the arrows A. When the end portion of the tongue 26a corresponding to the protrusions 38 has retracted into the narrow portion of the slot 30, an air gap remains through the slot 30 for allowing air circulation through the panel. Such a hooking arrangement is secure when the two panels 22 and 22a are pulled away from each other. This situation occurs when the panels surround a conifer which has a girth sufficiently large to maintain the adjacent panels away from each other, that is, as shown in FIGS. 7 and 8. Under these conditions, the length L of the tongue 26a exceeds the distance M of the slot 30 from the adjacent edge of the panel 22 and the difference between L and M provides a gap 42 allowing air circulation between the two panels 22 and 22a as shown in FIGS. 7 and 8.

It is possible to adjust the diameter of the conifer protector by slight reduction which consists in introducing the tongues 26a in slots 32 as shown in FIG. 8a. Such a reduction will cause the panel 22a to overlap panel 22 and consequently reduce the periphery of the conifer protector by a length corresponding to N-M multiplied by the number of panels around the periphery of the protector. However, such a reduction can be limited by the overlapping of only a limited number of adjacent panels.

The cross-section shown in FIG. 5 illustrates in particular the openings 36 and 34 and the slots 30 and 32 provided in the panel 22.

Figure 9A:
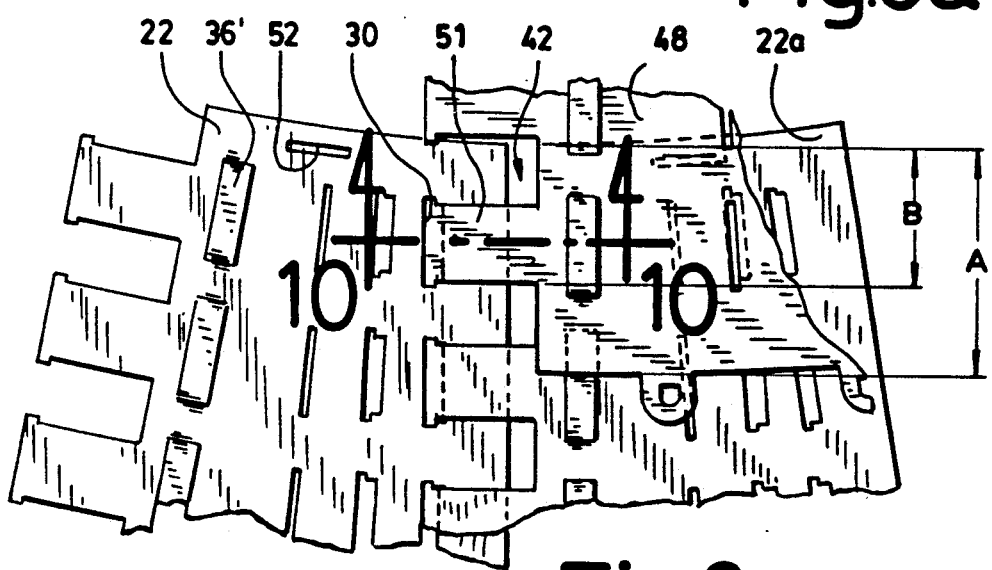
FIG. 9a is a front view of an embodiment for interconnecting superposed panels.

When a larger and taller conifer needs to be covered by panels according to the invention, an arrangement such as shown in FIGS. 2 and 2a is contemplated. The frusto-conical shape 44 comprising a plurality of panels 22 are assembled according to the desired periphery of the conifer 46. Such a cone-shape 44 has a height H equal to the height of the panels 10 shown in FIG. 1 and another set of panels 48 are mounted over the lower frusto-conical shape 44 and secured thereto. The lower part of the panels 48 are mounted to overlap the upper part of the panels 22 and 22a and at least one tongue 50 at the lower part of the panels 48 is introduced in the slot 30 as shown in FIG. 9a in order to vertically and rotatably support the panels 48 to the lower panels 22 and 22a. The overlapping distance equal to A is sufficient to prevent the panels 48 to be affected by the wind and the snow.

Figure 10:
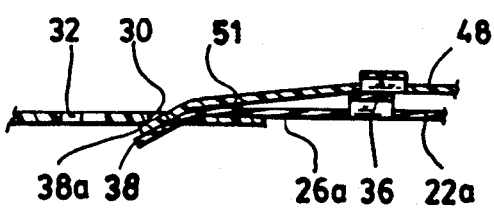
FIG. 10 is a cross-sectional view taken along line 10—10 of FIG. 9.

FIG. 10 illustrates the juxtaposition of the two tongues 26 and 50 secured in the slot 30.

This arrangement prevents horizontal and vertical movements of the upper panel 48 relative to the frusto-conical shape 44.

Figure 11:
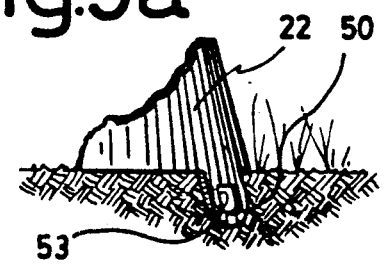
FIG. 11 is an enlarged view of encircled portion 11 shown in FIG. 2.

In order to prevent the conifer protector 10 according to the invention from tilting when blown by a strong wind or when pushed unintentionally, the panels, such as 22 in FIG. 11, are provided with tabs 50 along their lower edge. Those tabs extend in the same plane as the panels themselves and are provided with an internal aperture 53 which may penetrate by themselves in the ground or be held thereto by spikes introduced through the apertures 53. The tabs 50 have an additional use when the panels are not used as a conifer protector during the winter. During the remaining part of the year, the panels such as 22 are disassembled and stacked up one over the other and hooked to a wall by nails passing through the apertures 53 of the tabs 50. The storing of conifer protectors in the form of superposed flat panels generally made of flexible plastic constitute an additional characteristic of the present invention. The material used is preferably sheets of polyethylene having a thickness of about 0.045 inches. Such a thickness has been considered suitable for panels having a height H of about 36 inches considering that the panels are extensively perforated but must maintain a relative rigidity.

Considering that the protector according to the invention is intended to prevent ice and snow from damaging the conifers, all the slots such as 30 and 32, the openings 34 and the gaps 42 between adjacent panels as well as the openings 36 have a horizontal dimension not greater than about ¼ inch. Such a dimension prevents any large accumulation of snow inside the protector and allows a continuous flow of air through the conifer.

All the panels 22 are preferably made with the same dimension to facilitate their manufacturing and their storing. The height H of one panel has been preferably selected to have a dimension of 36 inches which when superposed, as shown in FIG. 2, the protector may cover a conifer of about six feet. Each trapezoidal panel 22 is designed to taper by an angle of about 12 degrees and to provide an angle at the apex of the conical protector by about 25 to 35 degrees as particularly characterized by the angle 14 degrees 30 minutes in FIG. 1. Reference character V defines the diameter of the cone at its bottom, the opening 16 at its apex is defined by a diameter equal to V-H/2. Such dimensions and proportions may vary with panels having a height H which differentiates from 36 inches.

An alternative embodiment for superposing protectors, such as shown in FIG. 2, is illustrated in FIG. 9. The panels such as 22 are provided along and adjacent their upper edge with slits or elongated perforations 52 dimensioned to allow the introduction of tabs 50 extending downwardly from the upper panels 48. The location of the perforations 52 is illustrated in FIGS. 3, 8, 8a and 9a and corresponds to the distances between the tabs 50. Means for locking the tabs 50 in the perforations 53 may be contemplated for increasing the interconnection of both superposed protectors.

I claim:

1. A conifer protector for protecting cone-shaped evergreen from ice, snow and wind, said protector including a plurality of adjacently positioned trapezoid panels, each panel having two-angularly disposed lateral sides, one of said sides having a plurality of spaced and laterally extending tongue members and the other of said sides having a marginal ledge provided with perforated longitudinally aligned slots adapted to interlockingly receive said tongues of one of said adjacent panels, said panels adapted to be assembled to form a frusto-conical protector, each of said panels having a plurality of narrow elongated openings disposed substantially parallel to said slots, said opening having a maximum width of about 0.25 inches.

2. A conifer protector as recited in claim 1, wherein each slot, when interlockingly connected to a tongue member, has a width sufficient to leave an air gap having a maximum horizontal length of about 0.25 inches.

3. A conifer protector as recited in claim 2, wherein said tongue members are flexible for allowing their folding under said ledge.

4. A conifer protector as recited in claim 2, wherein said tongue members have two lateral opposite protrusions at their free end, and the slots have two lateral clefts oppositely indented around said slots, said tongue members adapted to partly allow said tongue members and said protrusions to slide through said slots and said clefts, said lateral protrusions being adapted to hook each side of said slots upon retraction of said tongue members.

5. A conifer protector as recited in claim 4, wherein the width of said protrusions protrude to each side of said tongue members by a distance corresponding to the width of each of said cleft.

6. A conifer protector as recited in claim 2, wherein at least some of said openings are formed by an arched flap of material deformed out of said panels, said flaps displaying lateral gashes having a maximum width of about 0.25 inches sufficient to allow air passage upon normal climatic conditions.

7. A conifer protector as recited in claim 2, wherein said panels have two substantially parallel sides including a narrow upper side and a wide lower side, at least one anchor tab extending from said lower side in the plane of said panels, said anchor tab having a rigidity allowing retention of the panels to the ground.

8. A conifer protector as recited in claim 7, wherein each tab has a hole therethrough for gripping a stake in the ground, said hole being adapted to allow the panels to be suspended when the panels are stored.

9. A conifer protector as recited in claim 7, wherein the narrow side of the trapezoid panel has at least one slit for allowing the introduction of one tab of a corresponding superposed panel.

* * * * *